(12) United States Patent
Hopkins et al.

(10) Patent No.: US 6,507,765 B1
(45) Date of Patent: Jan. 14, 2003

(54) COMPUTER INTEGRATED MANUFACTURING CONTROL AND INFORMATION SYSTEM

(75) Inventors: Scott Hopkins, Dundee (GB); William McGregor, Glasgow (GB); Alec Moffat, West Lothian (GB)

(73) Assignee: HM Electronic Systems Limited, East Kilbride (GB)

( * ) Notice: Subject to any disclaimer, the term of this patent is extended or adjusted under 35 U.S.C. 154(b) by 0 days.

(21) Appl. No.: 09/247,376

(22) Filed: Feb. 10, 1999

Related U.S. Application Data (60) Provisional application No. 60/074,244, filed on Feb. 10, 1998.

(51) Int. Cl.[7] .............................................. G06F 19/00
(52) U.S. Cl. ........................... 700/95; 700/116; 29/705
(58) Field of Search ............................ 700/95, 96, 108, 700/109, 110, 112, 111, 215, 204, 116, 117; 29/705, 740, 832; 340/674

(56) References Cited

U.S. PATENT DOCUMENTS

| | | | | |
|---|---|---|---|---|
| 4,837,568 A | * | 6/1989 | Snaper ..................... 340/870.5 |
| 5,237,508 A | * | 8/1993 | Furkawa et al. ............... 700/9 |
| 5,329,690 A | * | 7/1994 | Tsuji et al. .................... 29/701 |
| RE35,027 E | * | 8/1995 | Regard ......................... 29/740 |
| 5,678,041 A | * | 10/1997 | Baker et al. ................... 705/26 |
| 6,154,957 A | * | 12/2000 | Tsubouchi et al. ............. 29/836 |
| 6,161,277 A | * | 12/2000 | Asai et al. ..................... 27/740 |
| 6,255,951 B1 | * | 7/2001 | De La Huerga ......... 340/573.1 |

* cited by examiner

Primary Examiner—Leo Picard
Assistant Examiner—Kidest Bahta
(74) Attorney, Agent, or Firm—McCormick, Paulding & Huber LLP (57) ABSTRACT

The present invention is directed to a distributed computerized control and information system for a manufacturing system which generates a product from distinct components, where the manufacturing system includes a plurality of processing machines which generate signals indicative of parameters of the processing machines' operation. The system includes a plurality of sensors in communication with an associated processing machine for non-intrusively obtaining parameter signals in real-time from the processing machine so as to not interfere with the parameter signal generation and transmission. Also included is a plurality of command apparatus in communication with an associated sensor for providing real-time analysis of the received parameter signal of the associated processing machine, and a summary station in communication with the plurality of command apparatus for providing real-time summary and detailed analysis of received parameter signals from associated processing machines. The operation of the processing equipment is independent of the operation of the summary station and the plurality of associated command apparatus.

9 Claims, 11 Drawing Sheets

COMPUTER INTEGRATED MANUFACTURING CONTROL AND INFORMATION SYSTEM

CROSS REFERENCE TO RELATED APPLICATION

Priority is claimed to U.S. Provisional Application No. 60/074,244, filed Feb. 10, 1998.

FIELD OF THE INVENTION

The present invention relates generally to a computer control system for manufacturing and more particularly to a computer integrated manufacturing real time control and information system.

BACKGROUND OF THE INVENTION

Manufacturers which generate products from a plurality of components, or even which perform an operation on a single component, need to get timely status information on their processing machines. A printed circuit board (PCB) manufacturing line is one example of such an environment. The PCBs travel along conveyer belts for conveyance among various processing machines. For example, a screening machine screen prints a selected pattern of liquid solder or epoxy onto a PCB, followed by a pick and place machine which selects and places various electronic components into the liquid solder on the PCB, and a reflow machine which then heats the solder to affix the component to the PCB. Each processing machine may have an associated host computer which runs the processing machine. If a processing machine is not functioning within the preset required parameters, and the operator is not informed in a timely manner, all products generated could be defective, even if all other processing machines are operating correctly. A number of different systems have attempted to use computers to track and control such product manufacturing operations.

For instance, some prior art systems employ a central system host that communicates directly with machine host computers. Such a system has several disadvantages. The machine host computers typically have limited processing power and are dedicated to running the particular manufacturing machine to which they are attached. Demands for data and processing time made by the central system host computer can interfere with the operation of a machine host computer, slowing production by the machine controlled by the host, and can crash the machine host, totally halting production. Furthermore, the central system host is typically located remote to the processing machines and collects data from numerous machines for historical analysis only, such as at the end of a shift or production period. Thus the machine host computer does not provide real time data to a human machine operator such that a problem can be corrected soon or immediately after it occurs. Instead, a supervisor learns hours later that a machine on a particular product line, though running, was actually producing numerous defective boards and production for the whole line was affected. In addition, because so much data is collected and processed by one central host, viewing and digesting the data in real-time may be a difficult, if not an impossible task for a human operator. Finally, even if the central system host computer informs the operator or supervisor in a timely manner, neither the supervisor nor the central system host computer are located proximate to the machine having a problem, and a quick response is therefore unlikely.

In another prior art approach, a personal computer may be inserted between each processing machine and its associated machine host computer, such as between a machine host computer and an associated screening machine, for controlling communication therebetween and for displaying error messages generated by the screening machine or the machine host computer. The personal computers on the production line may be connected via an interface. Such an approach also has disadvantages. A personal computer may be ill-suited to the noise, vibration, and dust of a typical manufacturing environment, and consumes valuable floor space. Secondly, the personal computers run software and typically include a full graphical user interface for running a variety of software applications. A bored technician running a computer game late at night can crash the personal computer and disrupt an entire production line by halting one or more manufacturing machines. In a worst case scenario, a computer game including a virus may be accidentally loaded onto the personal computer and all computers on the production line network may become infected and crash.

Alternatively, some production personnel have a limited education, or despite a high school education, have limited skills. A personal computer at each manufacturing machine can be intimidating and hence ignored. Furthermore, personal computer operating systems are not necessarily optimal for real time continual collection of data.

In prior art systems, the system host computer and the human operator thereof could easily be overwhelmed by the sheer volume of the data. Accordingly, such data was processed and displayed historically, well after it was generated, and of little use for real time feedback to a machine operator for correction of improvement of the performance of the operation of a processing machine.

A modern manufacturing electronics facility may involve a sea of millions of dollars of parts out on the manufacturing floor, and at times, there is little or no tracking of where the parts are, who or what machines are installing them, and how inventory is being affected. Machine operators, paid on a piecework basis, might be motivated simply to keep a manufacturing machine operating, though not necessarily operating at peak efficiency to produce defect free PCB's. Parts intended to be installed by one machine into one lot of PCB's can find their way onto other processing machines and into other PCB's, with no record of the switch. Years later, when PCB's may begin to fail in the field and a particular electronic component is targeted as the culprit, nonexistent or inaccurate processing records prevent quickly identifying the other PCB's likely to fail. The manufacturer must simply wait for additional failures, and therefore will likely lose customers.

Prior art systems do not adequately affix bar codes to all the individual parts used in the manufacturing process, such as individual reels, feeders, and device locations of a pick and place machine, or required scanning procedures that were laborious and easily circumvented. Machine operators paid on a per piece basis typically have one priority—keeping the processing machine running. Accordingly, in a hurry, reels of parts will be taken from one machine and placed onto another, and the reel scanned may not be the reel actually installed.

SUMMARY OF THE INVENTION

The present invention is directed to a computerized control and information system for a manufacturing system which generates a product from components, where the manufacturing system includes processing machines which generate signals indicative of the parameters of the processing machines' operation. The system includes a sensor in communication with a processing machine for non-intrusively obtaining a parameter signal in real-time from the processing machine so as to not interfere with the parameter signal generation and transmission, and a command apparatus in communication with the sensor for providing real-time analysis of the received parameter signal of the processing machine. The operation of the processing machine is independent of the operation of the command apparatus.

The present invention is also directed to a distributed computerized control and information system for a manufacturing system which generates a product from distinct components, where the manufacturing system includes a plurality of processing machines which generate signals indicative of parameters of the processing machines' operation. The system includes a plurality of sensors in communication with an associated processing machine for non-intrusively obtaining parameter signals in real-time from the processing machine so as to not interfere with the parameter signal generation and transmission. Also included is a plurality of command apparatus in communication with an associated sensor for providing real-time analysis of the received parameter signal of the associated processing machine, and a summary station in communication with the plurality of command apparatus for providing real-time summary and detailed analysis of received parameter signals from associated processing machines. The operation of the processing equipment is independent of the operation of the summary station and the plurality of associated command apparatus.

DETAILED DESCRIPTION OF THE PREFERRED EMBODIMENTS

Figure 1:
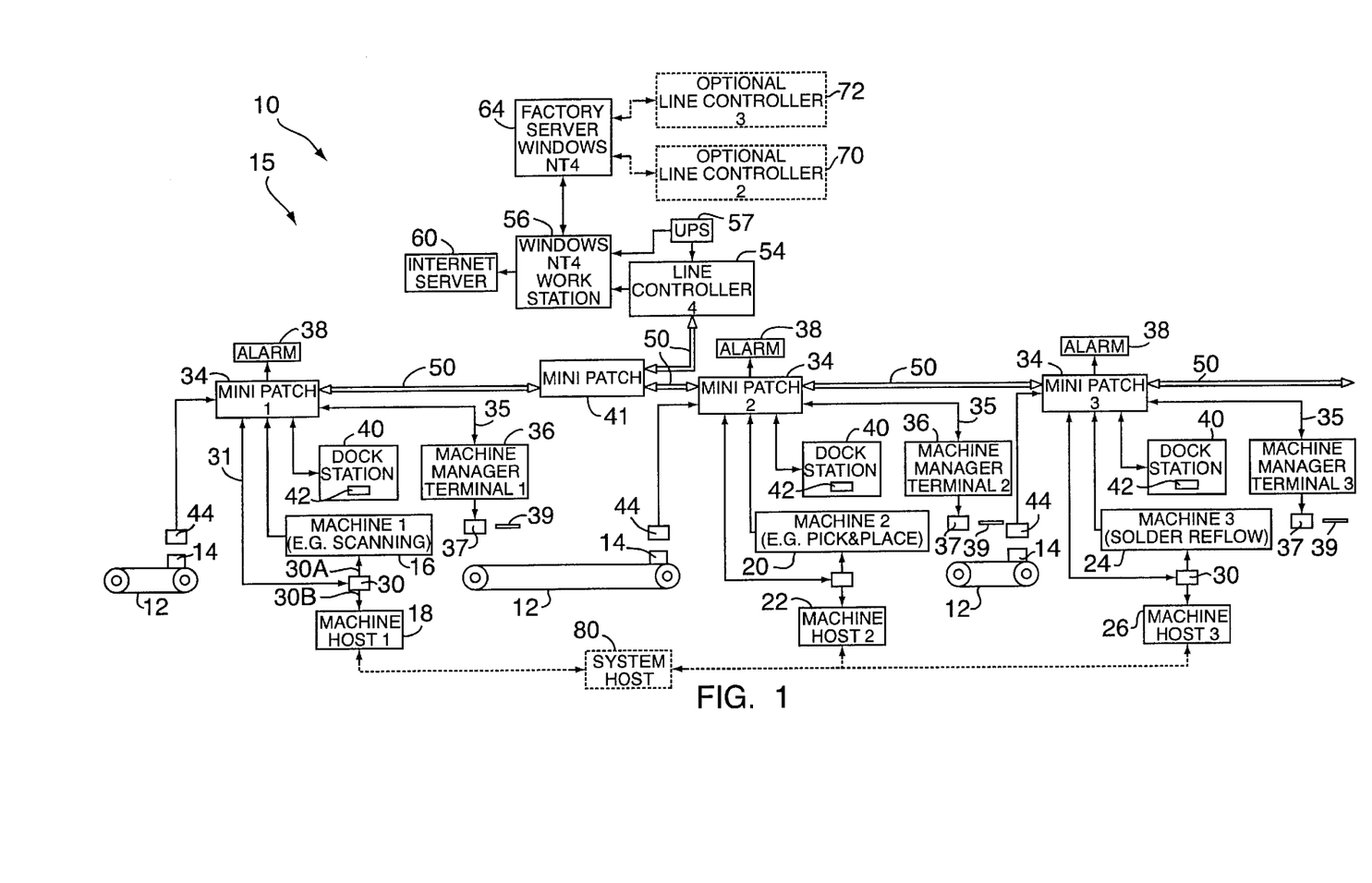
FIG. 1 is a block diagram of a computer integrated manufacturing control and information system (CIMCIS) embodying the apparatus of the present invention.

FIG. 1 illustrates generally a computer integrated manufacturing control and information system (CIMCIS) 10 or distributed computerized control and information system 10 according to the present invention, as employed in a process for the manufacture of printed circuit boards (PCBs) 14. The CIMCIS 10 includes robust, distributed processing of manufacturing data for providing realtime data analysis and feedback local to each manufacturing machine and for providing closed-loop control of the manufacturing process. Furthermore, the CIMCIS 10 may provide complete, real-time tracking of inventory, allowing complete traceability of the parts contained in a given finished PCB and the product manufacturing history. The CIMCIS 10 is adaptable to existing product manufacturing lines, and is non-intrusive, i.e., minimizes any adverse effects on the manufacturing machines, including the generation and transmission of parameter signals.

A PCB manufacturing line is illustrated in FIG. 1 as one example of an environment in which the present invention is beneficial. The PCBs 14 travel along conveyer belts 12 for conveyance among various processing/manufacturing machines. For example, a screening machine 16 screen prints a selected pattern of liquid solder or epoxy onto a PCB 14 having a predefined pattern of conducting metal deposited thereon. A pick and place machine 20 selects and places various electronic components into the liquid solder on the PCB 14. A reflow machine 24 then heats the solder to affix the component to the PCB 14. Although a manufacturing process for producing PCBs is illustrated in FIG. 1, the present invention may be employed in virtually any manufacturing process, as will be apparent to one of ordinary skill in the pertinent art in light of the following disclosure.

Each of the processing machines 16, 20 and 24 is typically controlled by a specialized and dedicated host computer, such as host computers 18, 22 and 26, respectively. For example, the host computer 18 either runs or downloads to the machine 16 a selected program for controlling the machine to deposit the selected pattern of solder on the PCB 14. The screening machine 16 is outfitted with various sensors for communicating messages, or parameters, back to the host computer 18 regarding the performance of the screening procedure. Messages, or parameters, may be sent as they are generated by the sensors, after the complete performance of the screen printing procedure on a particular board, or upon request by the host computer 18.

As illustrated in FIG. 1, associated with each of the processing machines 16, 20 and 24 are a non-intrusive data tap 30 (also referred to as sensor 30), a mini patch 34 which has a linkage 35 to a CIMCIS terminal 36 (also referred to as machine manager terminal 36 or command apparatus 36), including a dogtag reader 37 and at least one dogtag 39 assigned to the human operator of that machine, a docking station 40 for docking a handheld scanner 42, an alarm 38, and a fixed barcode scanner 44. A unit 15 includes the previously described associated CIMCIS equipment, such as a machine manager terminal 36. Associated with most if not all of the processing machines on a particular manufacturing line are a line controller 54, a work station 56 (also referred to as summary station 56), such as a Windows NT4 workstation, an internet server 60, and an uninterruptable power supply (UPS) 58. An RS 485 data bus 50 connects the mini patches 34 and the line controller 54. For ease of illustration the operation of processing machine 16 and the above equipment associated therewith is discussed in detail as representative. An additional mini patch 41 may be the means for connecting the line controller 54 to the RS 485 network 50. The internet server 60 can be an object running on another machine, such as the NT4 workstation 56. A factory server 64, which includes a console running a graphical user interface (GUI), can communicate with the work station 56. The line controller 54 may communicate with a dedicated mini patch 34, or with a mini patch associated with a particular machine, such as processing machine 20.

As an example, one of the non-intrusive data taps 30 eavesdrops on communications, or parameter signals, between the machine host computer 18 and the processing machine 16. Such communications, or parameter signals, include program instructions for running the processing machine, to screen a particular pattern of solder, and reports from the processing machine to the host computer 18 regarding the performance of the processing machine, which is typically outfitted with a host of sensors for reporting such data.

According to the present invention, data, or parameter signals, regarding each processing machine 16 is non-intrusively obtained and pre-processed locally to the processing machine 16 and in real time by the CIMCIS terminal 36 associated with that processing machine 16 before transmission to another computer, such as the workstation 56. The machine manager terminal 36 provides real time feedback to the human operator of the processing machine 16, yet is non-intimidating to those uninitiated to computers and provides very limited access to the network such that those persons who are computer literate cannot crash or cause a stoppage, inadvertently or otherwise, of any of the processors in the system, such as the machine manager terminal 36, the line controller 54, the workstation 56, or the factory server 64.

The present invention is also directed to increasing oversight and control of the manufacturing process to track and make a data record of all relevant manufacturing activities. Accordingly, the present invention includes fixed bar code scanners 44 each associated with a processing machine 16 for reading a bar code on each PCB that enters or leaves a particular processing machine 16 for work-in-process (WIP) tracking. The handheld scanner 42 and docking stations 40 allow scanning of all parts loaded onto a particular machine. The CIMCIS terminal 36 receives the bar code data, date and time stamps the data, and stores and/or transmits processed data records for complete traceability tracking of manufactured PCB's.

According to one aspect of the present invention, the CIMCIS terminal 36 includes a dogtag reader 37 that reads a hardware code of a dogtag 39. To silence the alarm 38, which can sound according to out of control conditions of the processing machine 16 as determined by a program control module running on the CIMCIS terminal 36, an operator must insert his or her assigned dogtag 39 into the dogtag reader 37. Each operator is issued a unique dogtag identification. Thus the CIMCIS terminal 36 stores a record of what problem is occurring, who is fixing it, and based on additional data from machine sensors and/or the handheld scanner 42, and docking station 40, the nature of the attempted solution, and when the problem was solved. The use of the dogtags 39 promotes accountability and serves as a deterrent to actions that may restart the processing machine 16 but that are detrimental to overall productivity. For example, operators have been known to simply repeatedly push a restart button on the processing machine 16 to keep a malfunctioning machine running. The CIMCIS terminal 36 may be programmed to detect consecutive restarts, shut down the power to the processing machine 16,(via a relay in the mini patch 34), ignore further insertion of the dogtag 39 of the operator and to require the insertion of a supervisors dogtag 39 to restart the processing machine 16. The whole translation is logged to a data record.

Referring to FIG. 1, the CIMCIS terminal 36 only accepts certain reels, and will sound the alarm or refuse to restart the processing machine 16 if the wrong reel of parts is installed in the wrong device location. Data records pertaining to the acceptable reel data may be downloaded to the CIMCIS terminal 36 from the workstation 56. In addition, the CIMCIS terminal 36 may download data to the handheld scanner 42 such that only certain reel, device locations, or feeders may be successfully scanned by the handheld scanner 42. Appropriate programming may be directed to the handheld scanner 42.

For example, according to the present invention, for an operator to change a reel of parts, the empty reel and the device location are both scanned with the handheld scanner 42, and the new reel scanned in to the scanner. Upon docking the scanner 42 the CIMCIS terminal 36 is informed of the new reel and only allows restart of the processing machine 16 if a recognized reel is in the device location. Not only does the CIMCIS terminal 36 require proper reloading of a device location, but the time, date and operator are logged such that improper loading attempts are also recorded.

Still referring to FIG. 1, the dogtag reader 37, dogtags 39, fixed bar code scanner 44, docking station 40 and handheld barcode scanner 42 allow complete traceability of the manufacturing process such that each part installed on a given PCB can be traced in terms of a particular machine, reel, device location, time, date, machine operator, and operating condition of the processing machine (e.g., temperature of the reflow oven). Collection of this data is facilitated by the distributed processing nature of the present invention. Rather than one central processor, the CIMCIS terminal 36, line controller 54, workstation 56, and factory server 64 distribute the processing to enhance data analysis and allow real time feedback of relevant data without interfering with the operation of the machine host computers 18. Additional line controllers 70, 72 may optionally be added to CIMCIS 10.

Figure 2:
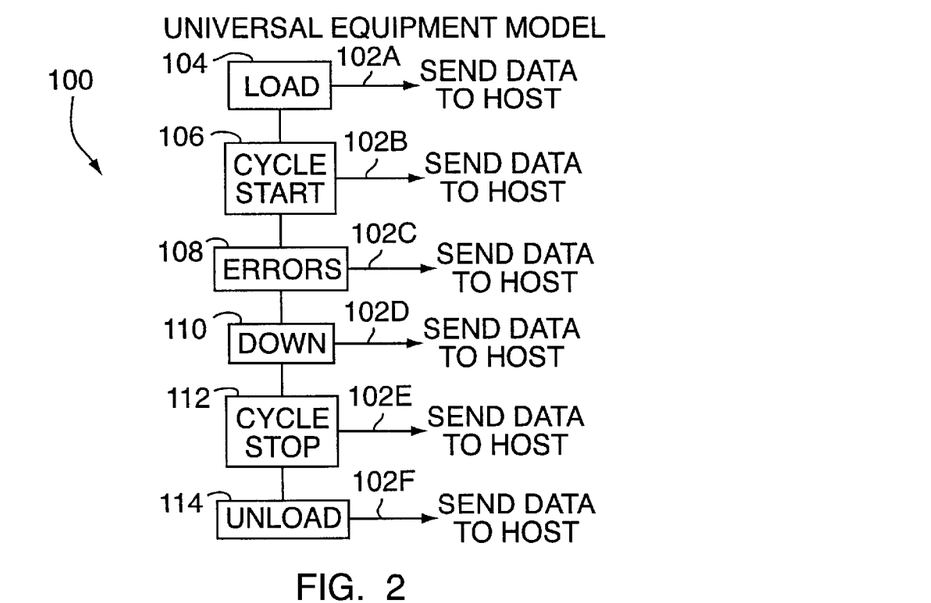
FIG. 2 is a block diagram illustrating the activity of a processing machine shown in FIG. 1 modeled according to a universal machine model.

Returning to a discussion of the reflow machine 16 and data acquisition and processing by the present invention, with reference to FIG. 2, the activity of the processing machine 16 can be modeled according to a universal machine model 100. The machine loads a PCB 14 (step 104), starts its cycle of operation on that PCB (step 106), reports any one of a variety of errors (step 108), the machine is down, such as stopped due to too many consecutive errors (step 110), indicates completion of a cycle, i.e., completion of the screening of a board (step 112), and unloads the PCB to the conveyer 12 for processing by the next processing machine 20 (step 114). In each of the cases enumerated above the processing machine 16 communicates to the host computer 18, as indicated by reference numerals 102A through 102F. The data tap 30 eavesdrops on these communications for reporting to the machine manager terminal 36 via an associated mini patch 34.

The CIMCIS terminal 36 processes the data signal signals 102 and makes numerous determinations of machine performance based thereon. An operator may select one of a plurality of screens for display on the CIMCIS terminal 36, and the terminal can be programmed to inform the operator of the corrective action required, and to confirm, via eavesdropping, that such corrective action has actually occurred.

Figure 3:
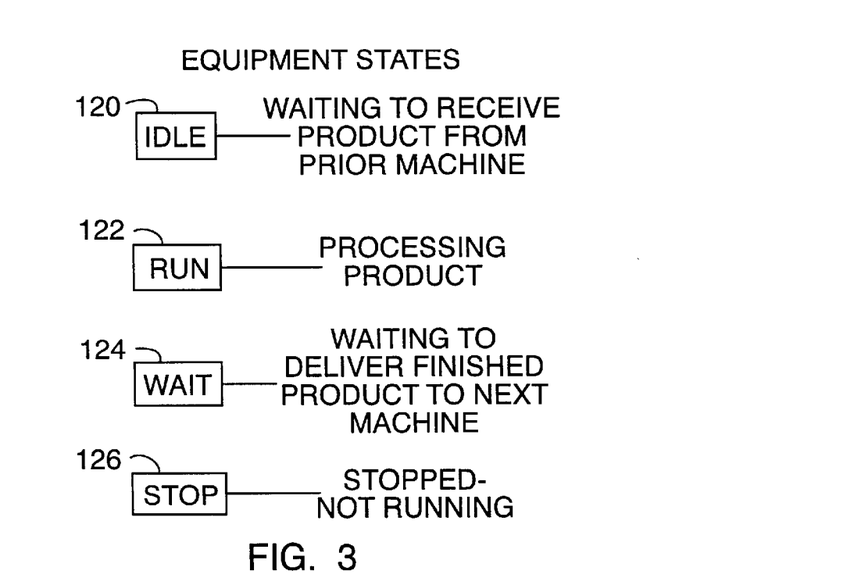
FIG. 3 is a block diagram of four equipment states of the processing machine shown in FIG. 1.

In one aspect of the invention, the CIMCIS terminal 36 processes the signals of FIG. 2 to determine when the processing machine 16 is in one of four states. These four states are illustrated in FIG. 3, and include an IDLE state 120, a RUN state 122, a WAIT state 124, and a STOP state 126. These machine states are included in a summary screen presented on an LCD display of the CIMCIS terminal 36.

Figure 4:
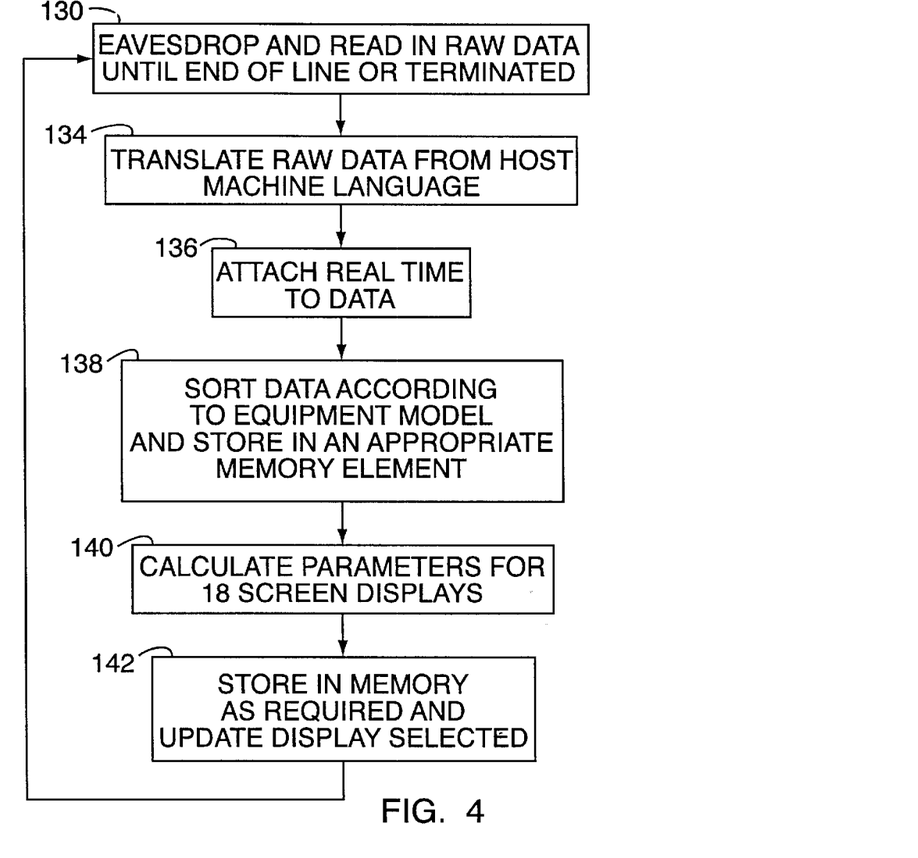
FIG. 4 is a block diagram illustrating the basic data operation of the terminal shown in FIG. 1.

FIG. 4 illustrates the basic data operation of the CIMCIS terminal 36 that allows determination of the machine states shown in FIG. 3 and which forms the basis of other data presented in other screens. The CIMCIS terminal 36 receives eavesdropped data in block 130 corresponding to the universal error model of FIG. 2, translates that data from the communication code used by the particular machine host computer 18,(block 134), and attaches the real time to a data record including the translated code (block 136). Next the translated data record is sorted according to the universal machine model of FIG. 2 and stored in an appropriate memory element (block 138). From the stored data, various parameters relating to performance of the processing machine 16 are calculated and displayed according to the particular display selected by a machine operator (block 140). These parameters are stored and displayed as necessary (block 142). For example, by comparing the time of a data record indicating that the processing machine 16 is loading a PCB to the time of a subsequent data record indicating that the processing machine 16 is unloading the PCB, the cycle time of the processing machine 16 is calculated for display as part of the summary screen.

Figures 5, 8, 18:
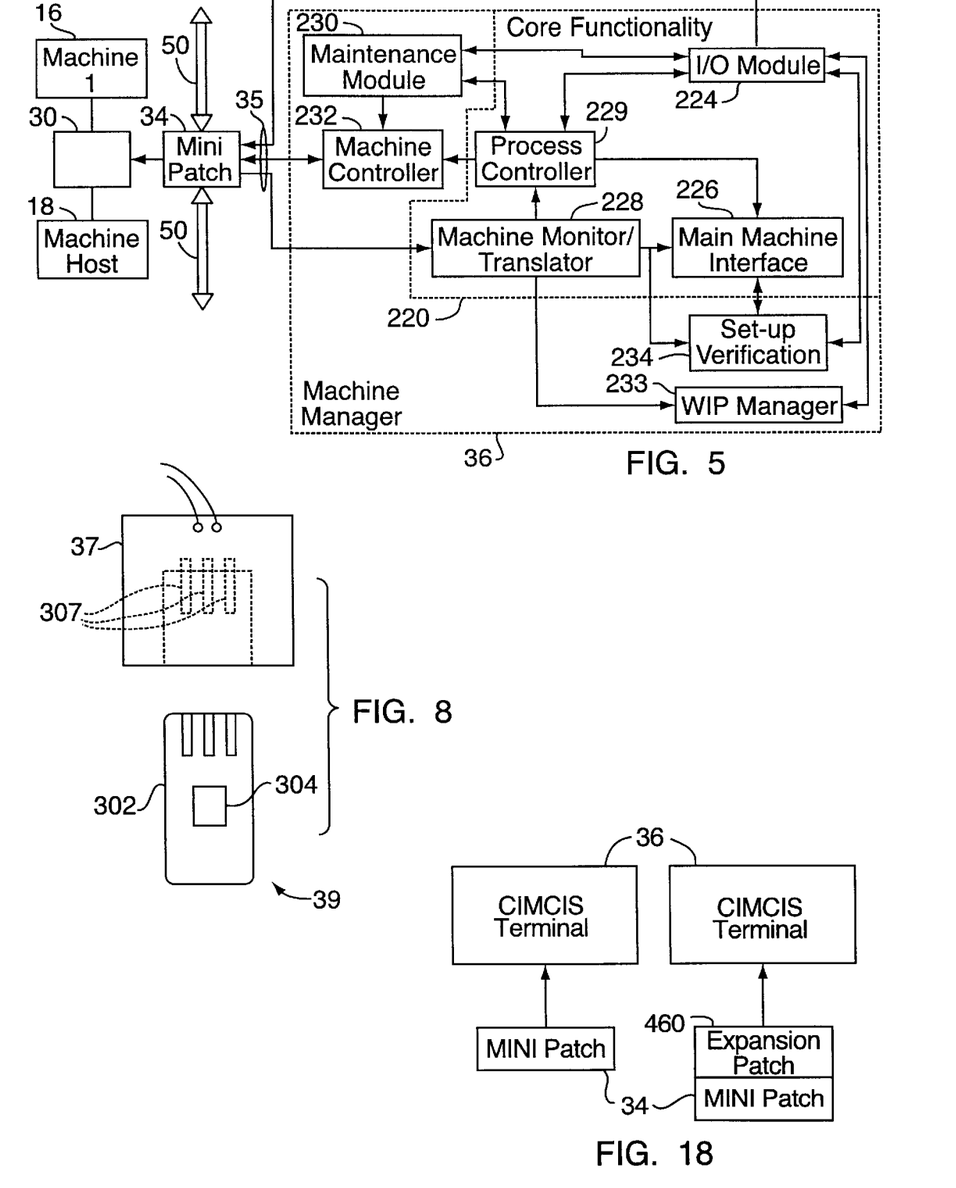
FIG. 5 is a block diagram illustrating the core functionality and some optional functional modules of the terminal shown in FIG. 1.
FIG. 8 is a block diagram showing a dogtag and dogtag reader found with the system of FIG. 1.
FIG. 18 is a block diagram showing an expansion patch optionally used with the mini patch found with the system of FIG. 1.

FIG. 5 illustrates the core functionality, as well as some optional functional modules, of the CIMCIS terminal 36. The functional core operations are illustrated as contained within dotted box 220. The CIMCIS terminal 36 includes a translator 228 for translating eavesdropped error codes generated by the processing machine 16 and host computer 18. Just as there are many language spoken by various peoples of the world, different manufacturers of processing machines 16 and host computers 18 may employ entirely different communication codes to represent errors or other machine information data. These communication codes are grouped together to form data strings. Either the manufacturer of the processing machine 16 and the machine host computer 18, or the purchaser of the machine may provide the definition and format of the data strings used by the processing machines 16 and host computers 18.

After translation, a process controller 229 performs the actions indicated in FIG. 4. A process controller 229 communicates with the RS 485 bus via an input/output module 224 and with a man/machine interface 226 (i.e. a display and keypad). Other functional modules may include a maintenance module 230 and a machine controller 232, which allows selection of performance criteria of the processing machine 16 which, when not met, may trigger the alarm and/or cause operation of the machine 16 to cease. The set-up verification module and (work in progress) WIP module use data from the handheld scanner 42 and the fixed scanner 44.

One of ordinary skill in the pertinent art, in light of the disclosure herein, can typically as a matter of design choice implement many aspects of the functionality the present invention, such as the functionality of the CIMCIS terminal 36, including the display of on-screen menus, calculation of performance criteria, and the performance of memory searches to locate data records, as a combination in varying degrees of hardware, firmware, and software. Such choices may determine the type of processor used and the hardware associated with the processor. These matters of design choice are deemed within the scope of the present invention. In a preferred embodiment, the majority of the functionality of the CIMCIS terminal 36 is implemented via firmware in order to limit access to the system and to reduce the level of operator skill required.

Referring to FIG. 5, the processing power and interface 226 of the CIMCIS terminal 36 are tailored advantageously to meet the needs of the operator and to increase the efficiency of the manufacturing process. For example, an operator cannot play a computer game on a CIMCIS terminal and risk crashing an entire manufacturing line. Additionally, the CIMCIS terminal 36 and its interface will not typically intimidate those operators not familiar with personal computers. Floor space is conserved, as the CIMCIS terminal 36 may be attached by magnet to a processing machine 16, Nevertheless, the CIMCIS terminal 36 includes enough onboard processing power for effective real time processing of data and to render useful real time feedback directly to a machine operator. Data communicated to the line controller 54 is pre-processed, reducing the load on the workstation 56 associated with the line controller and on the volume of information that must be carried by the RS 485 network. The line controller 54 provides a standard interface to the line regardless of the type of processing machines 16, 20, 24, and is a hub for the CIMCIS terminal 36.

Figure 6:
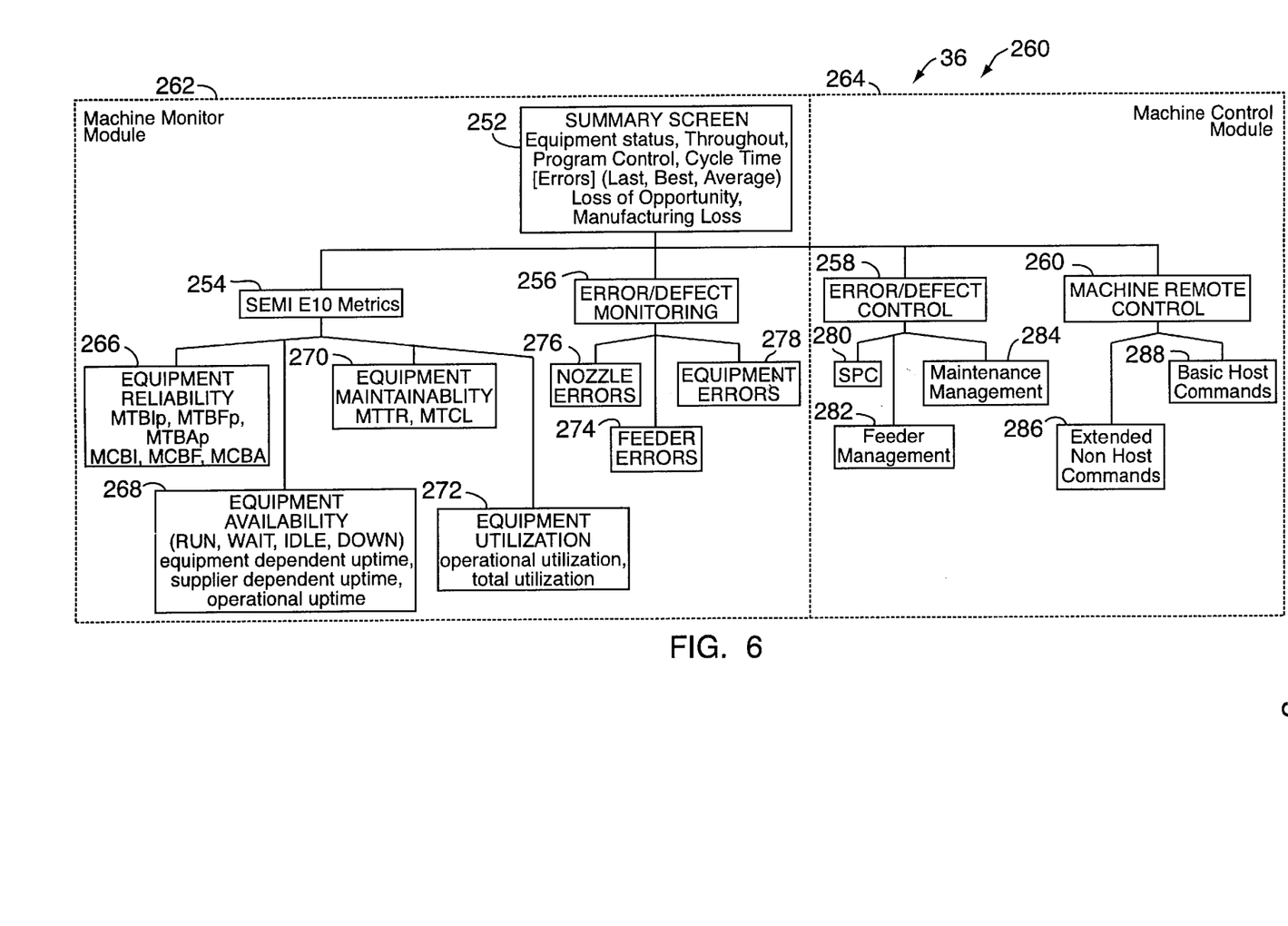
FIG. 6 is a block diagram illustrating an overview of the functional modules of the terminal shown in FIG. 1.

FIG. 6 is a block diagram indicating a more detailed breakdown of some of the functional modules of the CIMCIS terminal 36. Such functionality relates to the plurality of screen displays which may be implemented. The machine manager 250 can functionally be divided into specific groupings, including a statistical summary screen 252, SEMI E10 metrics 254, error and defect monitoring 256, error 35 and defect control 258, and machine remote control 260. The architecture of the machine manager 250 can be grouped into two main modules, the machine monitor module 262 and the machine control module 264. Generally, the machine control module 264 relates to the "out of control" screens and to controlling the processing machine 16, such as for example, ceasing processing machine operations or sounding the alarm 38 when certain parameters are determined by the CIMCIS terminal 36 to be unmet or exceeded. The CIMCIS terminal 36 can stop operation of the processing machine 18 via a relay in a mini patch 34.

Still referring to FIG. 6, the summary screen function 252 includes the calculation and displaying of machine cycles, program data, best/last average cycle time, cycle consistency and loss of opportunity. The SEMI E10 metrics function 254 utilizes SEMI E10-96 Standards for Definition & Measurement of Equipment Reliability, Availability, and Maintainability. The equipment reliability function 266 includes calculating and displaying Mean (Productive) Time Between Interrupts (MTBIp), Mean (Productive) Time Between Failures (MTBFp), Mean (Productive) Time Between Assists (MTBAp), Mean Cycles Between Interrupts (MCBI), Mean Cycles Between Failures (MCBF), and Mean Cycles Between Assists (MCBA). The SEMI E10 metrics also includes equipment availability 268 utilizing the SEMI E10-96 Reliability metrics, such as Run, Wait, Idle, and Down time. The equipment maintainability function 270 utilizing the SEMI E10-96 Maintainability metrics including calculating and displaying MTTR and MTOL. The equipment utilization function 272 utilizes the SEMI E10-96 Utilization Metrics including operational utilization and total utilization.

Continuing with FIG. 6, the error/defect monitoring function 256 calculates and displays the top errors for each of the error groups of feeder 274, nozzle 276 and type 278. The error/defect control function 258 includes process control 280, feeder management 282, and maintenance management 284. The machine remote control function 260 includes extended non host commands 286 and basic host commands 288.

Figure 7:
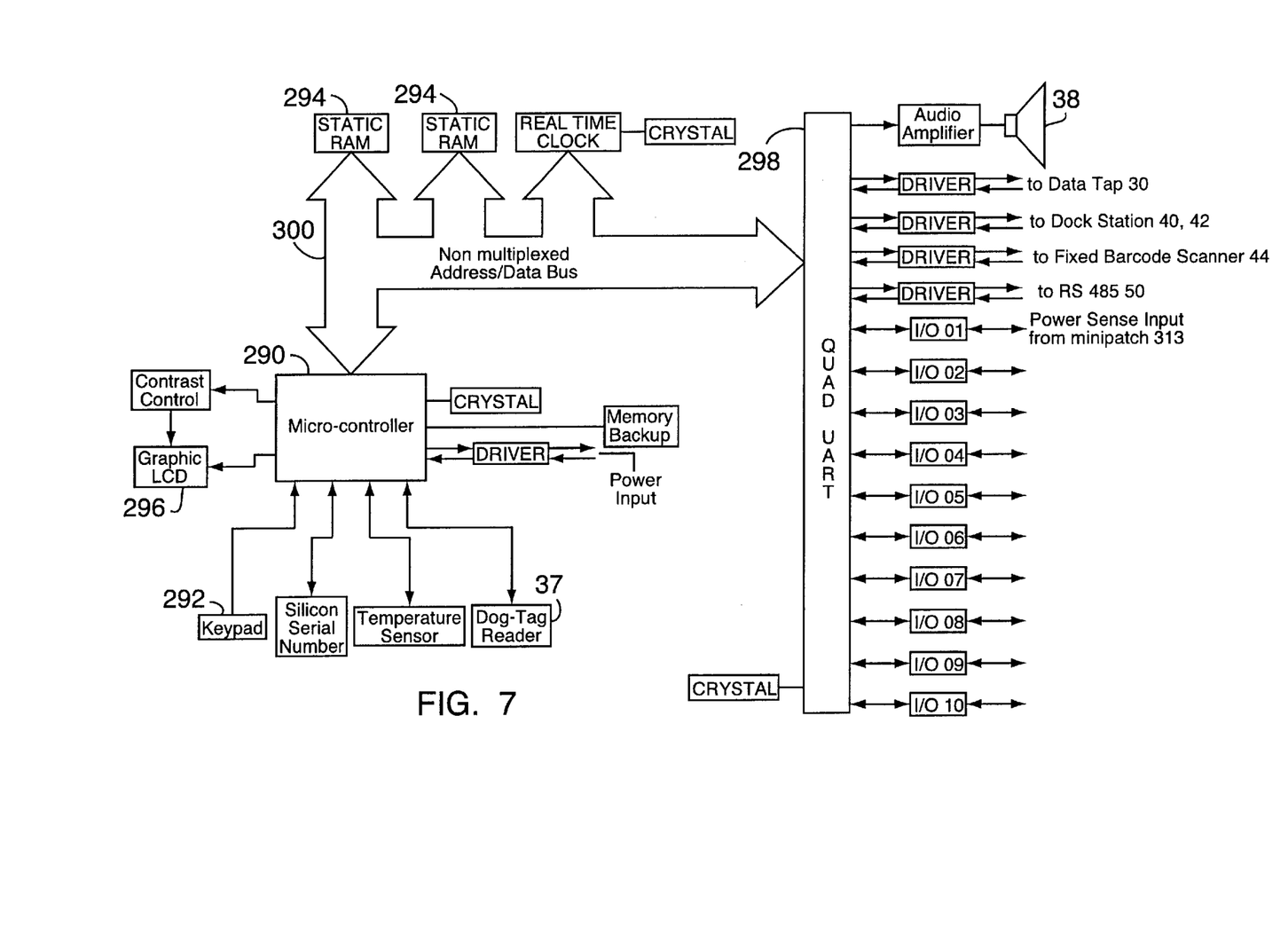
FIG. 7 is a block diagram of the principal hardware components of the terminal shown in FIG. 1.

FIG. 7 is a block diagram of the principal hardware components of the CIMCIS terminal 36. The heart of the CIMCIS terminal hardware is a Dallas Semiconductor CMOS 8051 Compatible Microcontroller 290. In communication with the microcontroller 290 are a membrane keypad 292, CMOS static RAM 294, a Graphic LCD 296, the dogtag reader 37, a UART 298, as well as the other components illustrated in FIG. 7. The UART 298 allows the Dallas microcontroller 290 to communicate, via a bus 300 and the UART, with the alarm 38, non intrusive data tap 30, docking station 40 and handheld scanner 42, fixed scanner 44 and RS 485 bus 50.

As also illustrated in FIG. 1, the workstation 56 may communicate with an internet server 60 for posting as a web page the performance of that particular manufacturing line. The web page may provide the same summary screens as are viewable on the workstation 56. Posting a web page on the internet server 60 has several advantages. Manufacturing data may be viewed worldwide. For smaller companies without extensive in-house networking capabilities, the internet may serve as a temporary or inexpensive communications network. Furthermore, any viewer of the web page communicates with the work station 56 and is removed from communication with the actual manufacturing machines, such as processing machine 16, so that any chance of interfering with the operation of the machine host computer 18 and the processing machine 16 is minimized. The web page displaying operations of the product manufacturing line may be conveyed to users, for example, in a Pointcast type application.

FIG. 8 is an illustration of a typical dogtag 39. The dogtag 39 may be fabricated from a piece of printed circuit board 302 that includes a Dallas Semiconductor D 5401 "silicon serial number" chip 304. The-D5401 includes a hard coded serial number that is read by the dogtag reader 37 and is thereupon communicated to the CIMCIS terminal 36. The dogtag 39 includes electrically-conductive contacts 306 electrically connected with the D5401 304 and which mate with corresponding electrically-conductive contacts 307 in the dogtag reader 37 upon insertion of the dogtag. The dogtag reader 37 and dogtag 39 are used to restrict access to a processing machine 16 to certain personnel, to further allow certain operations to be performed by selected personnel, to keep a complete record of who works on or with the processing machine, what actions they perform and when, and to facilitate the setup, verification, material and equipment management procedures by tracking the identity of individuals as well as the time actions that are performed.

Figure 9:
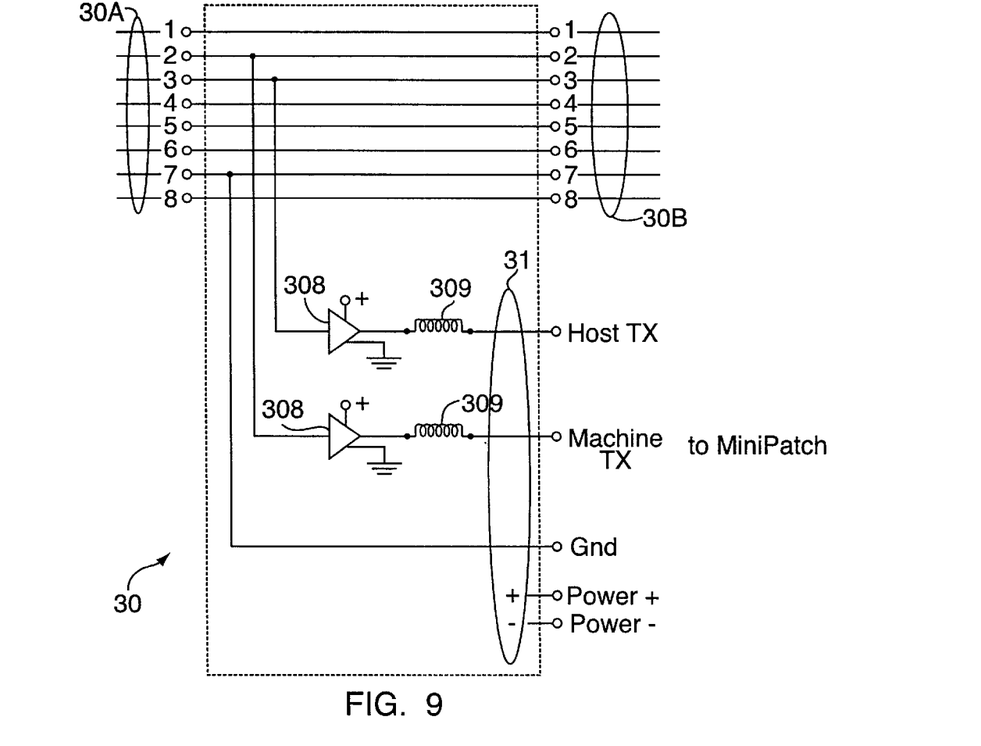
FIG. 9 is a schematic diagram illustrating a typical non-intrusive data tap found with the system of FIG. 1.

FIG. 9 illustrates a typical non-intrusive data tap 30 according to the present invention. The data tap 30 includes Max 202 charge pump drivers 308 and filters 309 to minimize the effect of the data tap on communication between a processing machine 16, and a machine host computer. The filters 309 and drivers 308 may not be necessary in all applications, but have been found often to be useful.

Figure 10:
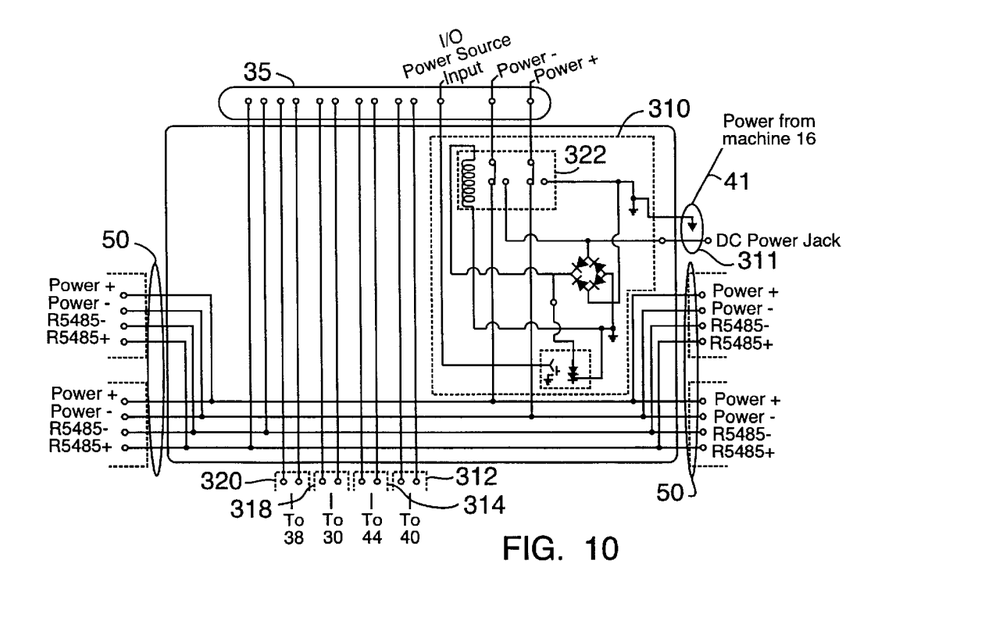
FIG. 10 is a schematic diagram illustrating a typical mini patch found with the system of FIG. 1.

FIG. 10 illustrates a typical CIMCIS mini patch 34. The mini patch 34 includes four connectors for access to the RS 485 network 50, a connector 320 for communication to the alarm 38, a connector 312 for communication with the docking station 40 and the handheld scanner 42, a connector 314 for connection to the fixed bar code scanner 44, and a connector 318 for connection to the non-intrusive data tap 30. According to one aspect of the present invention, the universal power supply (UPS) 58 provides power along the network 50 (see conductors labeled+power and−power) for backup powering of the CIMCIS terminals 36. Accordingly, a dc power jack 311 may derive power from the processing machine 16 for supply to the CIMCIS terminal 36. If the processing machine 16 power fails, the mini patch 34 includes a circuit 310 for automatically switching the CIMCIS terminal 36 to obtain power from the UPS 58 and for informing the CIMCIS terminal, via line 313, that the processing machine power has failed for logging of this event by the CIMCIS terminal. As understood by one of ordinary skill in pertinent art, though depicted in FIG. 1, a separate mini patch 34 is not always required for connection to the line controller 54.

According to another aspect of the present invention, the electrical connections of the CIMCIS 10 may be color coded to facilitate interconnection and ease of installation of the system. As a consequence, factory personnel need not involve computer professionals to install or modify the system, thereby greatly reducing installation time and cost. For example, connections to the RS 485 network 50 are red, connections to the alarm 38 are black, connections to the fixed bar code scanner 44 are green, connections to the docking station 40 for the handheld scanner 42 are yellow, and connections to the non-intrusive data tap 30 are blue. A beige cable interconnects the CIMCIS terminal 36 to the mini patch 30.

As is understood by one of ordinary skill in the pertinent art, in light of the disclose herein, the mini patch 34 may also include a relay 322, such as G5V2 12V double-pole, double-throw relay (DPDT) 322, for allowing the CIMCIS terminal 36 to halt the operation of the processing machine 16. The relay 322 is in electrical communication with the CIMCIS terminal 36 and the processing machine 16. For example, if based on calculation of eavesdropped data, the CIMCIS terminal 36 determines that certain performance criteria of the processing machine 16 are not being met, the terminal may sound the alarm, cease operation of the processing machine 16, inform the operator of the problem, and according to eavesdropped data and internal programming of the CIMCIS terminal, instruct the operator on corrective action. The CIMCIS terminal 36 interacts with the operator via a simple LCD interface 296 and a membrane keypad 292.

Figure 11:
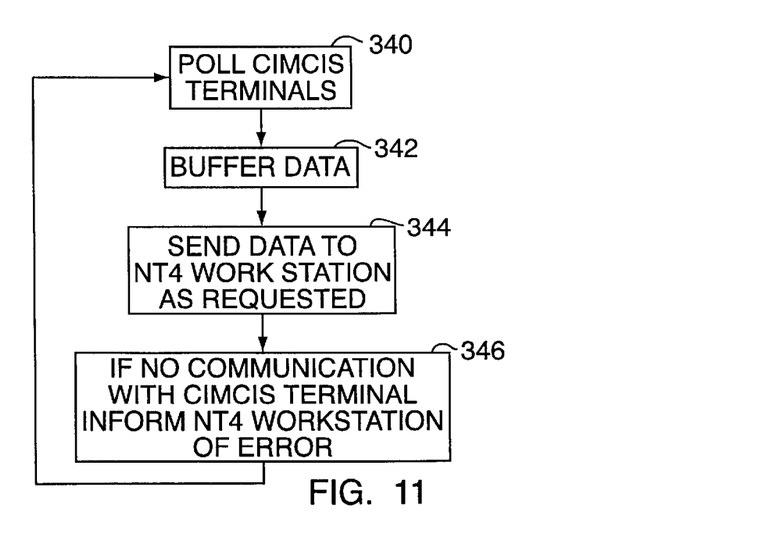
FIG. 11 is a flow chart illustrating the operation of a line controller found with the system of FIG. 1.

FIG. 11 is a flow chart illustrating the operation of the line controller 54. The line controller 54 continually polls the CIMCIS terminals 36 for data (step 340). Upon receiving data, the data is typically stored in a buffer (step 342) until the NT4 workstation indicates that it can receive the data (step 344). The line controller 54 then transmits the data to the NT4 workstation (step 344), or other appropriate workstation, for display. If the line controller 54 determines that there is no communication link with the CIMCIS terminal (step 346), the workstation is informed of a communication error.

Figure 12:
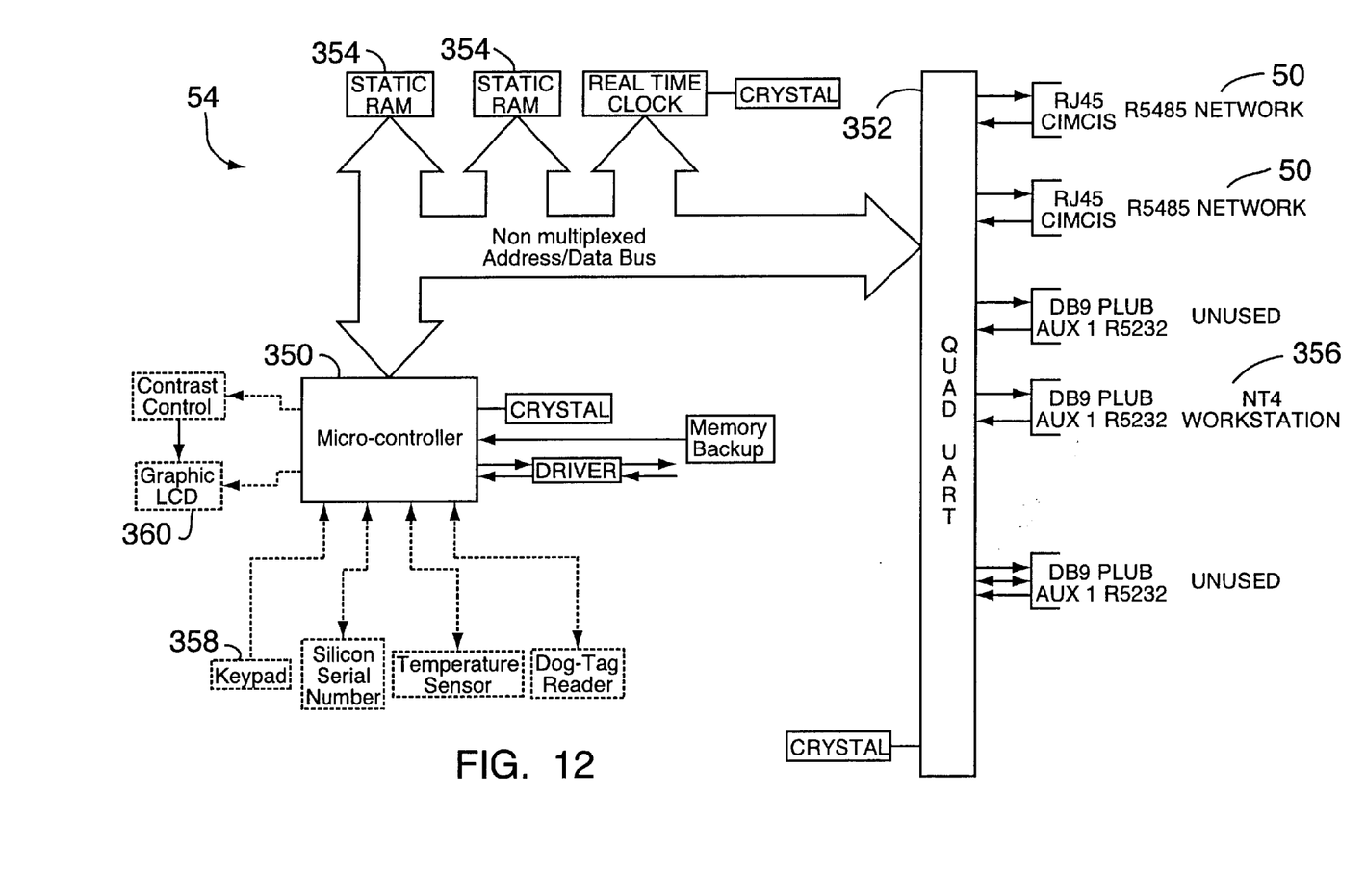
FIG. 12 is a block diagram of the principal hardware components of a line controller found with the system of FIG. 1.

FIG. 12 is a block diagram of the line controller 54. A Dallas DS5002FP CMOS microcontroller 350 polls the CIMCIS terminals 36 via the UART 352 and the RS 485 network 50 and stores data in 512K static RAM buffers 354 until the data is sent to the workstation 56 via the UART to an RS 232 connection 356. As indicated by the dotted blocks, a keypad 358 and LCD display 360, as well as other components, may be optionally included with the line controller 54.

Figure 13:
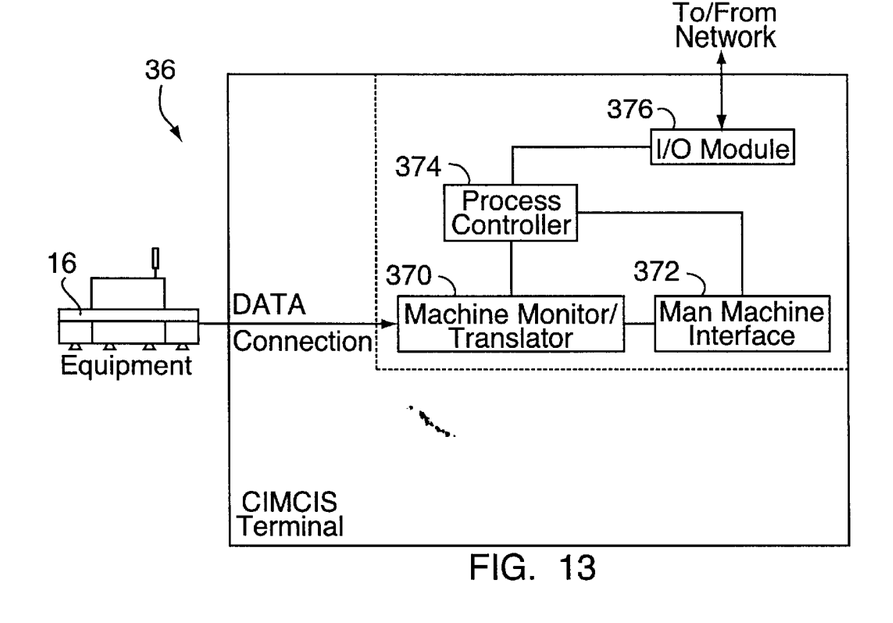
FIG. 13 is block diagram showing the core functionality of the terminal found with the system of FIG. 1.

FIG. 13 is a block diagram of the CIMCIS terminal 36. The CIMCIS terminal 36 connects to equipment via the CIMCIS COM module. The machine monitor/data translator 370 decodes the equipment specific data to CIMCIS generic status'. This allows CIMCIS structure above this level to be largely generic in architecture or structure. Some equipment platforms will require specific functionality/displays. CIMCIS status data is then processed to provide the following, as shown in FIG. 6: SEMI E10 metrics 254 such as availability 268, reliability 266 and maintainability 270, CIMCIS metrics 252 such as cycle time, loss of opportunity and consistency. Also included are error monitoring and display 256, and a process controller 258 which provides C charting control for machine attributes and X bar R SPC for machine variables. This data may be unprocessed from the processing machine 16 or calculated within the CIMCIS terminal 36.

Still referring to FIG. 13, the data is displayed using the CIMCIS terminal display, including the man machine interface (MMI) 372. The display format is a number of custom designed screens summarized by periods, with a default period of one hour. Up to 28 hours of data may be stored within the terminal 36 in a first-in first-out (FIFO) stack. The process controller 374 allows the user to specify control limits. If these limits are exceeded, the user is alerted by means of the MMI using Audio/Visual messages which depend upon the out-of control condition. The user must appropriately respond to the out-of-control condition in order to silence the alarm. The I/O module 376 passes all of the raw and summarized data to the line controller 54 using the RS 485 network 50.

Figure 14:
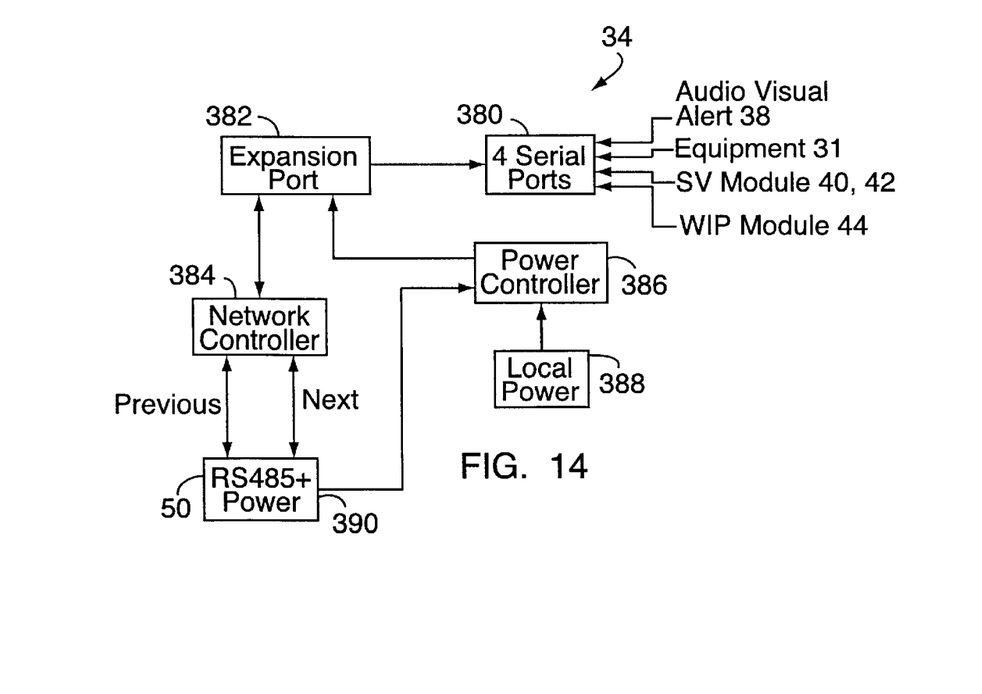
FIG. 14 is a block diagram showing principal hardware components of a mini patch found with the system of FIG. 1.

FIG. 14 is a block diagram showing the principal hardware components of the CIMCIS mini patch 34. The mini patch 34 is a mini hub for the CIMCIS terminal 36 which utilizes RJ45 connections and provides three functions. These functions include duplicating the terminal's 36 four RS232 serial ports 380 and the RS 485 network connection 50, and allowing other peripherals such as the fixed barcode scanner 44, handheld scanner 42 and docking station 40, equipment connection 31 and alarm 38 to be plugged in remotely from the terminal, therefore keeping the cabling neat. The mini patch 34 also provides multiple sockets 382 for the RS 485 multidrop connections 384.

Still referring to FIG. 14, the mini patch 34 provides a power controller 386 for controlling power to the CIMCIS terminal 36. Usually the terminal 36 is powered by a local power source 388 such as a power outlet on the processing machine 16. However, if local power 388 is unavailable, the mini patch 34 will automatically switch to network power 390 by using spare conductors in the Hyperlan Category 5 cable used to connect the network. The mini patch 34 also indicates the status of the network 50, alarm 38, equipment connection 31, handheld scanner 42 and docking station 40, and the fixed barcode scanner 44 by using colored 35 LCD's which may be observed through the substantially transparent front of the mini patch 34.

Figure 15:
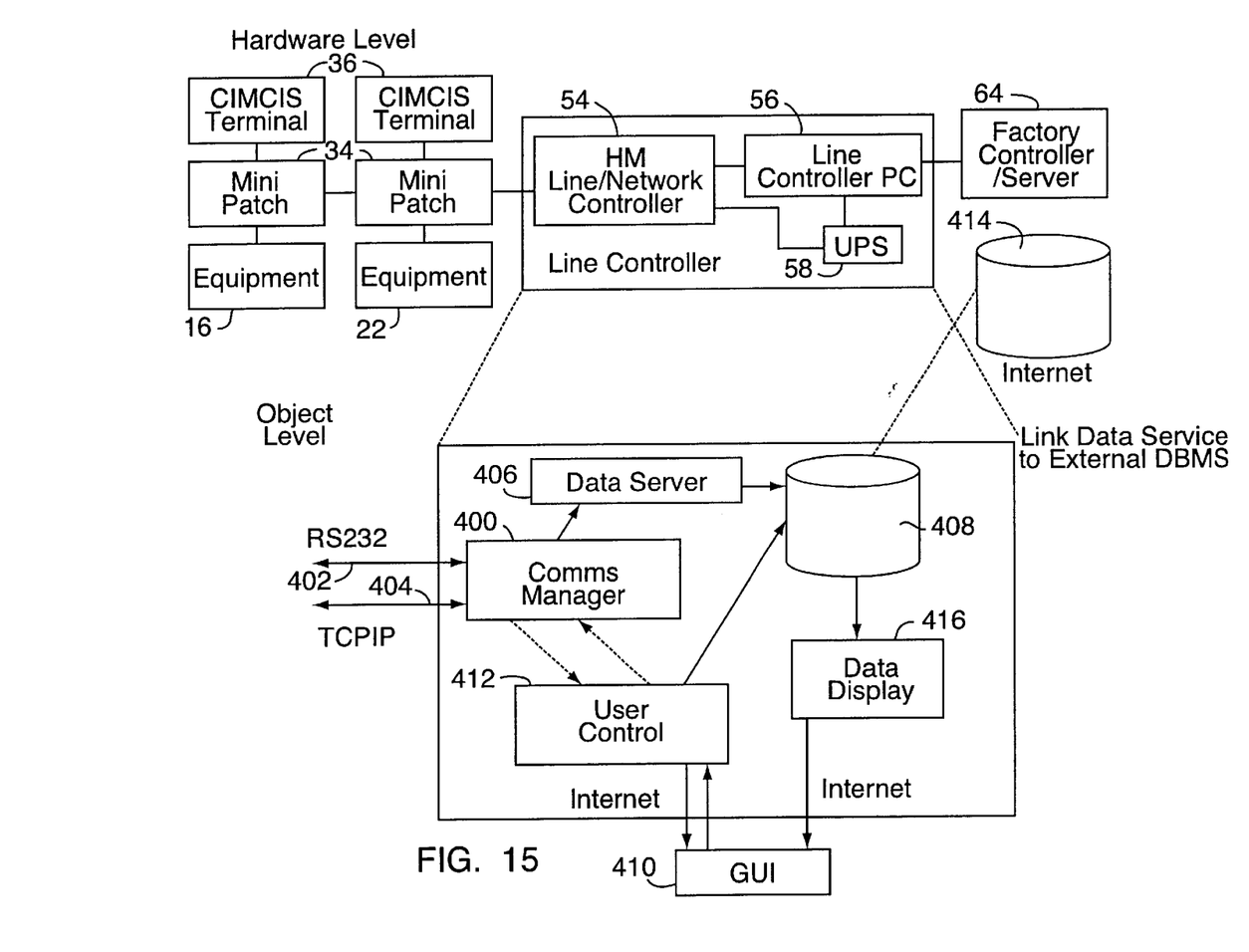
FIG. 15 is a block diagram showing system modules and an internet link found with the system of FIG. 1.

FIG. 15 is a block diagram showing CIMCIS system 10 modules on a hardware level and an object level view of line controller components which include the line controller 54, the work station 56, and the uninterruptable power supply (UPS) 58. The line controller 54 includes a communications manager object 400 which communicates with the work station 56 via a communications protocol such as RS 232 402, and with the internet via a communications protocol such as TCPIP 404. The communications manager 400 passes parsed data to a data server 406 which accesses a database module 408. A Graphical User Interface (GUI) object 410 is used to display information on the work station 56 screen and to pass commands from the user to the CIMCIS terminal 36 via a user control object 412. The information displayed on the work station 56 may also be accessed remotely through the internet. The data display object 416 permits software and databases 414 to reside either on the work station 56 or on the factory controller 64, preferably configured as Windows NT machines.

Figure 16:
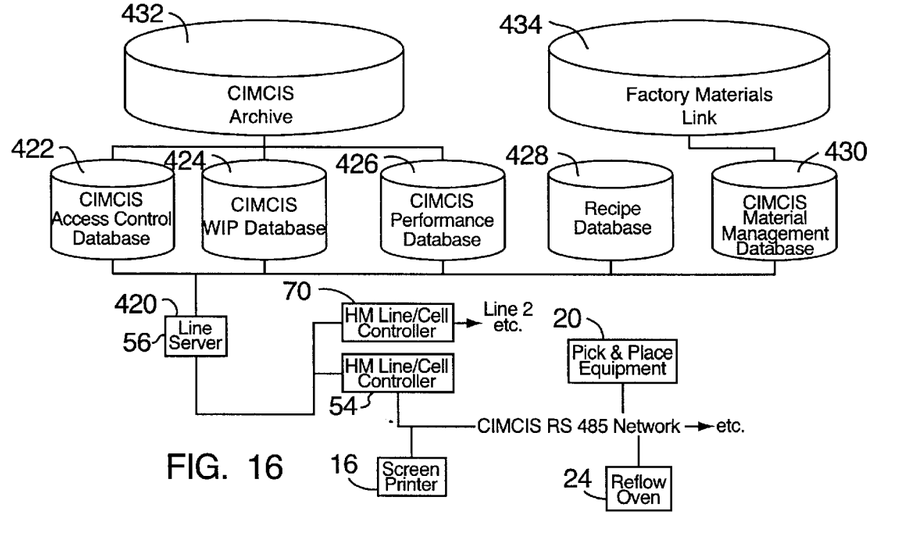
FIG. 16 is a block diagram of a simplistic system architecture of the system of FIG. 1.

Referring to FIG. 16, the work station 56 includes a CIMCIS line manager module 420. The line manager 520 may communicate with multiple databases, such as an CIMCIS Access Control database 422, a CIMCIS Work In Progress (WIP) database 424, a CIMCIS Performance database 426, a Recipe database 428 and a CIMCIS Material Management database 430. The line manager 420 may also have access to a CIMCIS Archive 432 and a Factory Materials link 434. These databases may be stored locally on the work station 56 or remotely, such as on the factory controller/server 64. The line manager 420 provides line level comparisons of individual equipment performance in an industry standard graphical user interface (GUI) environment, such as Windows NT4, and provides data storage in standard formats, such as Microsoft Access or SQL compliant databases. The line manager 420 offers linking capability to other CIMCIS modules such as Manufacturing Material Control link, Setup Verification, Work in Progress (WIP) Tracking, and also provides a data interface to and from the outside world, including the use of the internet. This allows linking to factory material systems, defect tracking systems and Management Information Systems (MIS). The CIMCIS Line Manager interface standard includes pull down menus and point & click selections. Multiple line controllers 54, 70 may be connected to a work station 56 (line server 56).

Figure 17:
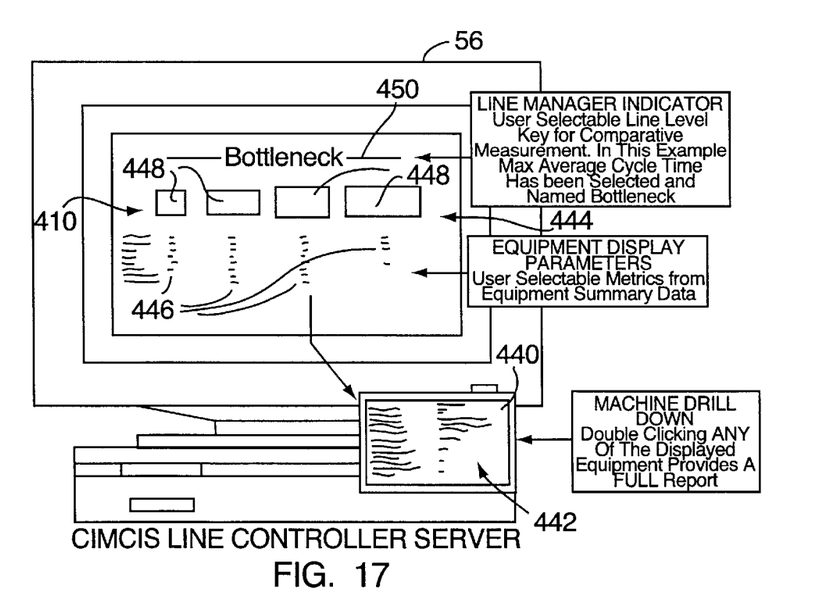
FIG. 17 is a representation of information shown on a display screen found with the system of FIG. 1.

As shown in FIG. 17, one feature of the present invention is a Graphical User Interface (GUI) 410 for the presentation of data collected from CIMCIS terminals 36. Screens of the GUI 410 can be presented at the workstation 56 (CIMCIS line controller server 56) by the line manager 420 or at the factory server 64, and posted on the internet as a web site that is updated with real time information, such as with a Pointcast type system. A web browser, such as Internet Explorer 4.0 (I.E. 4), is used as a container application for GUI objects. Static web pages are displayed for applications which are not done with I.E. 4. The line manager information is web compatible by the use of languages such as Visual Basic(VB) Script and Active X. A plurality of windows that must be continually opened and closed can confuse a user of a GUI 410. Accordingly, the present invention employs a material drill down screen 440 that displays additional real time information 442 as requested. Double clicking on any of the displayed processing machine representations 448 provides a full report on that processing machine 16 on the screen. Processing machines 16 may be illustrated serially 444 as arranged on a production line, and important real time information 446 regarding that processing machine is listed adjacent to the processing machine representation 448. User selectable fields are available from the equipment summary data 252 from the CIMCIS terminal 36, and an auto analyzer is available. The GUI also displays a line manager indicator 450 which is an user selectable line level key for comparative measurement.

FIG. 18 is a block diagram showing a CIMCIS expansion patch 460 which allows the 32 spare I/O lines which are available in the CIMCIS terminal 36 to be used for direct connection to processing machine 16 sensors or switches. The expansion patch 460 plugs directly into the mini patch 34 using the 25 way expansion port 382 and duplicates the expansion port for connection to the terminal 36 using the original expansion cable.

Referring to FIG. 18, there are 3 basic methods for connection of the CIMCIS terminal 36 to a processing machine 16. If no host computer 18 exists, the expansion patch 460 can interface directly with the processing machine's 16 sensors, switches and indicators. These connections may be optically isolated or relay switches depending on requirements. Custom expansion patches are available where a generic expansion patch 460 does not match the processing machine's 16 interface. In the preferred embodiment, a second method of connecting the CIMCIS terminal 36 with a processing machine 16 is used when the processing machine cannot operate in a stand alone mode and is therefore connected to a host computer 18. The processing machine 16 communicates with the host computer 18 to receive numeric control (NC) programs or send status data. If the communication between the processing machine 16 and the host computer 18 is by point to point serial communications, a T piece is inserted into the communication line by unplugging the communications cable at the processing machine 16 and inserting the non-intrusive tap 30. The non-intrusive tap 30 contains electronics to ensure the communication line is not loaded. The CIMCIS terminal 36 also contains the capability of injecting a signal in order to imitate the client or the host computer 18 in order to request data not transmitted under normal operation. In systems where the communication between a processing machine 16 and a host computer 18 is via multi-drop or network means, the address of the processing machine 16 is monitored used simple terminal emulation on the network.

A third method of connecting the CIMCIS terminal 36 to a processing machine 16 is used where the processing machine operates in stand alone mode but also has the capability of communicating with a host computer 18. In this case, the CIMCIS terminal mimics the host computer 18, which allows data to be requested or listened to. If a host computer 18 is already present, then the second method of connecting the CIMCIS terminal 36 to a processing machine 16 is used.

It will thus be seen that the present invention solves many of the problems outlined above. Because certain changes may be made in the above constructions without departing from scope of the invention, it is intended that all matter presented in the above description or shown in the accompanying drawings be interpreted as illustrative and not as limiting. For example bar codes and bar code scanners are but one method to track parts and PCB's, as dogtags and dogtag readers are but one method to track personnel. Other techniques, such as RF badges or tags and readers therefore are known in the art, and deemed within the scope of the invention. Furthermore, a manually assembled part may also be tracked by the present invention. Also contemplated within the scope of the present invention is the operation of a single machine manager terminal and associated hardware and software, such as a data tap and docking station, for use in a manufacturing operation in which only one processing machine is utilizing the present invention.

What is claimed is:

1. A monitoring and control system for use with a manufacturing system that generates a product from distinct components and includes at least one processing machine in communication with at least one host computer, wherein the processing machine generates parameter signals indicative of the processing machine's operation and the host computer provides closed loop control of the processing machine in response to the parameter signals, said monitoring and control system comprising:

one or more units each associated with a separate processing machine, wherein each said unit includes:
a non-intrusive data sensor;
a command apparatus;
a means for tracking components processed by the processing machine;
a means for tracking product entering or leaving the processing machine;
a means for identifying an operator of the processing machine;
wherein said sensor is in open loop communication with the processing machine to non-intrusively obtain the parameter signals in real-time so as to minimally interfere with parameter signal generation and transmission; and
wherein said command apparatus is in communication with said sensor and is operable to generate analysis signals indicative of a real-time analysis of processing machine performance from the parameter signals,
wherein said command apparatus permits only work related functions and is disposed local to the processing machine; and
wherein the operation of the processing machine is independent of the analysis signals generated by said command apparatus.

2. The system of claim 1, further comprising:
a summary station in communication with a plurality of said units, said summary station operable to generate and display summary signals indicative of a real-time summary of the analysis signals; and
wherein the operation of each processing machine is independent of the functioning of said summary station.

3. The system of claim 2, further comprising:
a line controller in communication with said command apparatus, said line controller operable to store the parameter signals and said analysis signals, said line controller also in communication with said summary station for transmitting the parameter signals and said analysis signals to said summary station.

4. The system of claim 2, further comprising a computer server in communication with said summary station for presentation of said summary signals to a computer network.

5. The system of claim 1, wherein each said unit further comprises a mini patch positioned between said sensor and said command apparatus, wherein said mini patch is operable to cease the operation of said processing machine.

6. The system of claim 1, wherein said sensor is coupled between said processing machine and a host computer.

7. The system of claim 1, wherein said means for tracking components includes:
a handheld scanner operable to create component signals by scanning components loaded on the processing machine; and
a docking station for receiving the handheld scanner;

wherein said docking station communicates said component signals to said command apparatus, thereby enabling the recordation of components processed by the processing machine.

8. The system of claim 1, wherein the means for tracking product includes:

a stationary scanner operable to create product signals by scanning product entering or leaving the processing machine, and to communicate said product signals to said command apparatus.

9. The system of claim 1, wherein the means for identifying includes:

a dogtag operable to produce a dogtag signal, wherein said dogtag signal is indicative of said operator; and a dogtag reader for reading said dogtag signal, said dogtag reader in communication with said command apparatus.

* * * * *